United States Patent
Nandan et al.

(10) Patent No.: US 12,112,399 B2
(45) Date of Patent: Oct. 8, 2024

(54) LOW LATENCY STREAMING REMAPPING ENGINE

(71) Applicant: TEXAS INSTRUMENTS INCORPORATED, Dallas, TX (US)

(72) Inventors: Niraj Nandan, Plano, TX (US); Rajasekhar Reddy Allu, Plano, TX (US); Mihir Narendra Mody, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 77 days.

(21) Appl. No.: 17/520,861

(22) Filed: Nov. 8, 2021

(65) Prior Publication Data

US 2022/0058768 A1 Feb. 24, 2022

Related U.S. Application Data

(63) Continuation of application No. 16/909,710, filed on Jun. 23, 2020, now Pat. No. 11,170,464.
(Continued)

(51) Int. Cl.
*G06F 9/50* (2006.01)
*G06F 9/54* (2006.01)
*G06T 1/60* (2006.01)

(52) U.S. Cl.
CPC ............ *G06T 1/60* (2013.01); *G06F 9/5027* (2013.01); *G06F 9/5066* (2013.01); *G06F 9/544* (2013.01)

(58) Field of Classification Search
CPC ...... G06F 9/5027; G06F 9/5066; G06F 9/544; G06T 5/00; G06T 1/60
See application file for complete search history.

(56) References Cited

U.S. PATENT DOCUMENTS

| 10,152,767 | B1 | 12/2018 | Hanson et al. |
| 2016/0189350 | A1 | 6/2016 | Glotzbach et al. |

(Continued)

OTHER PUBLICATIONS

Hegde, Kartik et al. "HTS: A Hardware Task Scheduler for Heterogenous Systems." Jun. 29, 2019. arXiv:1907.00271v1 [cs.OS] 11 pages.
(Continued)

*Primary Examiner* — Jacob Petranek
(74) *Attorney, Agent, or Firm* — Michael T. Gabrik; Frank D. Cimino

(57) ABSTRACT

A lens distortion correction function operates by backmapping output images to the uncorrected, distorted input images. As a vision image processor completes processing on the image data lines needed for the lens distortion correction function to operate on a group of output, undistorted image lines, the lens distortion correction function begins processing the image data. This improves image processing pipeline delays by overlapping the operations. The vision image processor provides output image data to a circular buffer in SRAM, rather than providing it to DRAM. The lens distortion correction function operates from the image data in the circular buffer. By operating from the SRAM circular buffer, access to the DRAM for the highly fragmented backmapping image data read operations is removed, improving available DRAM bandwidth. By using a circular buffer, less space is needed in the SRAM. The improved memory operations further improve the image processing pipeline delays.

19 Claims, 10 Drawing Sheets

Related U.S. Application Data

(60) Provisional application No. 62/956,988, filed on Jan. 3, 2020.

(56) References Cited

U.S. PATENT DOCUMENTS

| | | |
|---|---|---|
| 2017/0011493 A1 | 1/2017 | Eldar |
| 2017/0195564 A1 | 7/2017 | Appia et al. |
| 2018/0189105 A1 | 7/2018 | Sanghvi et al. |
| 2018/0315170 A1 | 11/2018 | Mills |
| 2019/0347763 A1 | 11/2019 | Goel et al. |

OTHER PUBLICATIONS

Moffitt, Michael D. et al. "Scalable Scheduling for Hardware-Accelerated Functional Verification." Proceedings of the Twenty-First International Conference on Automated Planning and Scheduling, 2011, pp. 162-169.

Clemente, Juan Antonio et al. "A Mapping Scheduling Algorithm for Hardware Acceleration on Reconfigurable Platforms." ACM Transactions on Reconfigurable Technology Systems, vol. V, No. N, Article A, Accepted 2013. DOI: http://dx.doi.org/10.1145.0000000.0000000. 28 pages.

Hanhirova, Jussi. "Performance Analysis of Hardware Accelerated Scheduling." Thesis submitted for examination for degree of Master of Science in Technology, Aalto University School of Science, Dec. 11, 2014, 78 pages.

Usui, Hiroyuki et al. "SQUASH: Simple QoS-Aware High Performance Memory Scheduler for Heterogeneous Systems with Hardware Accelerators." SAFARI Technical Report No. 2015-0003 (Mar. 18, 2015), pp. 1-20.

Mody, Mihir et al. "Flexible and Efficient Perspective Transform Engine" 2017 IEEE International Conference on Consumer Electronics-Asia (ICCE-Asia). pp 111-114.

Hongshi, Wang et al. "The Distortion Correction of Large View Wide-angle Lens for Image Mosaic Based on OpenCV." 2011 International Conference on Mechatronic Science, Electrical Engineering and Computer, Aug. 19-22, 2011, Jilin, China, pp. 1074-1077.

(N,M) - BLOCK ROW, BLOCK COLUMN

| FMD | FETCH MESH DATA |
| FID | FETCH IMAGE DATA |
| MBB | MESH BOUNDING BOX COMPUTE |
| IBB | IMAGE BOUNDING BOX COMPUTE |
| CAFF | AFFINE ON BLOCK CORNER CO-ORDINATES |
| CMESH | MESH ON BLOCK CORNER CO-ORDINATES |
| P | BLOCK MAIN PROCESSING (AFFINE AND MESH) |
| OW | OUTPUT WRITE |

LOW LATENCY STREAMING REMAPPING ENGINE

RELATED APPLICATION

This application is a continuation of U.S. patent application Ser. No. 16/909,710, filed on Jun. 23, 2020, which claims priority to U.S. Provisional Patent Application No. 62/956,988, filed Jan. 3, 2020, each of which is hereby incorporated by reference.

BACKGROUND

1. Field

The field relates to image distortion processing.

2. Description of the Related Art

Electronics use in vehicles is increasing daily. In addition to the conventional engine controller, transmission controller, infotainment unit, body controller and the like, the advent of numerous safety and autonomous systems are greatly increasing the processing done inside a vehicle. For example, adaptive cruise control may entail intercommunication between a radar system, an engine controller and a transmission controller. More advanced features, such as collision avoidance and autonomous operation, may require significant image processing.

Forward facing cameras provide images from the front of the vehicle for lane departure warnings, traffic sign recognition, collision alert and object detection. Such cameras commonly use wide angle or fisheye lenses to increase the captured scene. However, wide angle or fisheye lenses conventionally induce distortion in the captured images. To correct the distortion, backward remapping or backmapping processing, from the output image to the input image, must be used. Because of the distortion, a one-to-one line remapping is not possible and multiple input lines are processed to develop one output line.

Conventionally, the input image data is stored in DRAM (dynamic random access memory) and distortion processing occurs on a frame-by-frame basis, as each input frame has completed other processing. The wait for a frame to be finished processing delays the image processing pipeline. The multiple input lines needed for a single output line hinders stream operations from the DRAM, requiring numerus new page operations, thus increasing used DRAM bandwidth and creating further delays in the image processing pipeline.

SUMMARY

A lens distortion correction function operates by backmapping output images to the uncorrected, distorted input images. As a vision image processor completes processing on the image data lines needed for the lens distortion correction function to operate on a group of output, undistorted image lines, the lens distortion correction function begins processing the image data, rather than waiting for a full frame to be ready. This improves image processing pipeline delays by overlapping the operations. The vision image processor provides output image data to a circular buffer in SRAM (static random access memory), rather than providing it to DRAM. The lens distortion correction function operates from the image data in the circular buffer. By operating from the SRAM circular buffer, access to the DRAM for the highly fragmented backmapping image data read operations is removed, improving available DRAM bandwidth. By using a circular buffer, less space is needed in the SRAM. The improved memory operations further improve the image processing pipeline delays.

BRIEF DESCRIPTION OF THE FIGURES

For a detailed description of various examples, reference will now be made to the accompanying drawings in which.

DETAILED DESCRIPTION

Figure 1:
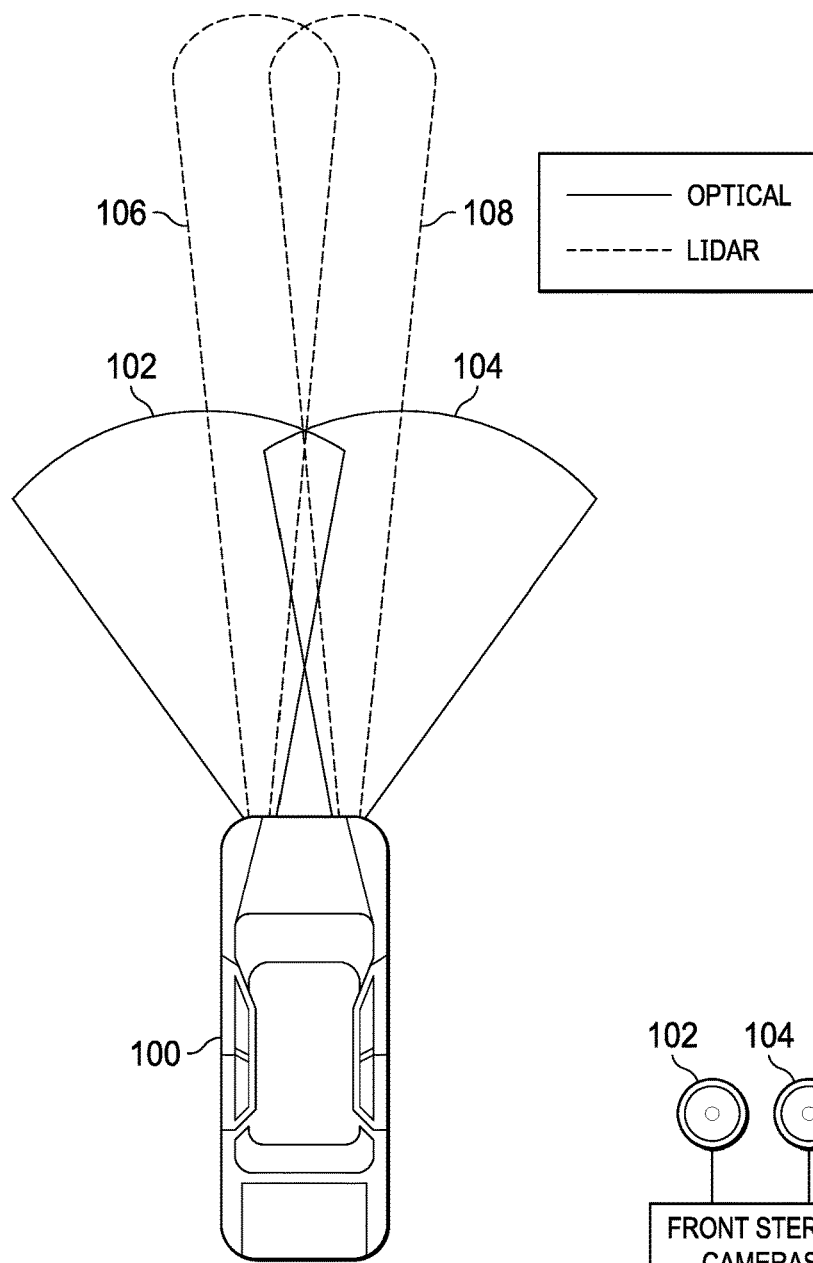
FIG. 1 is a drawing of a vehicle and the fields of view of various sensors.

Referring now to FIG. 1, a vehicle 100 is shown. The vehicle 100 includes a series of cameras or optical sensors. Left camera 102 and right camera 104 provide images from the front of the vehicle 100 for lane departure warnings, traffic sign recognition, collision alert and object detection. A left LIDAR (light detecting and ranging) sensor 106 and a right LIDAR sensor 108 provide image streams from the front of the vehicle 100 for lane and object detection. These camera and LIDAR sensors provide the input streams to various advanced driver assistance systems (ADAS). Cameras and LIDAR sensors are just examples and many other sensors, such as radar and ultrasonic and the like can be used as well.

Figure 2:
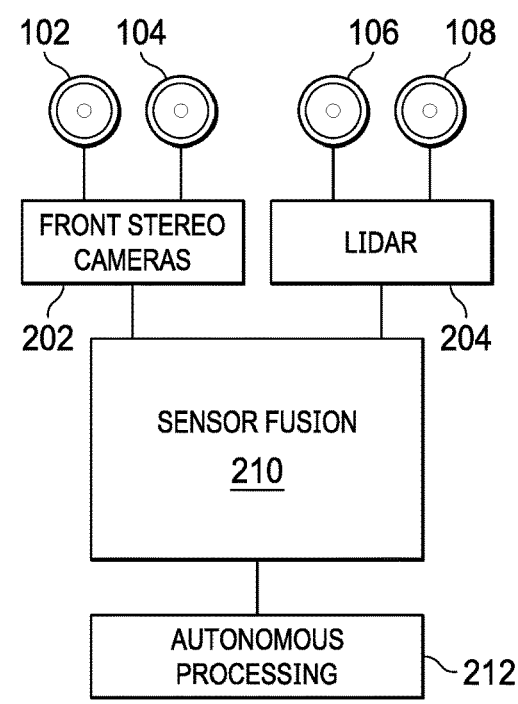
FIG. 2 is a block diagram of the sensors in the vehicle of FIG. 1.

Referring now to FIG. 2, cameras 102 and 104 are connected to a front cameras module 202. LIDAR sensors 106 and 108 are connected to a LIDAR module 204. The front cameras module 202 and the LIDAR module 204 are connected to a sensor fusion module 210 which integrates the various sensor outputs developed by the other modules. An autonomous processing module 212 is connected to the sensor fusion module 210 to perform autonomous processing needed for vehicle operation. More or fewer sensors can be connected to a given module and multiple sensor types can be provided to a single module.

Figure 3:
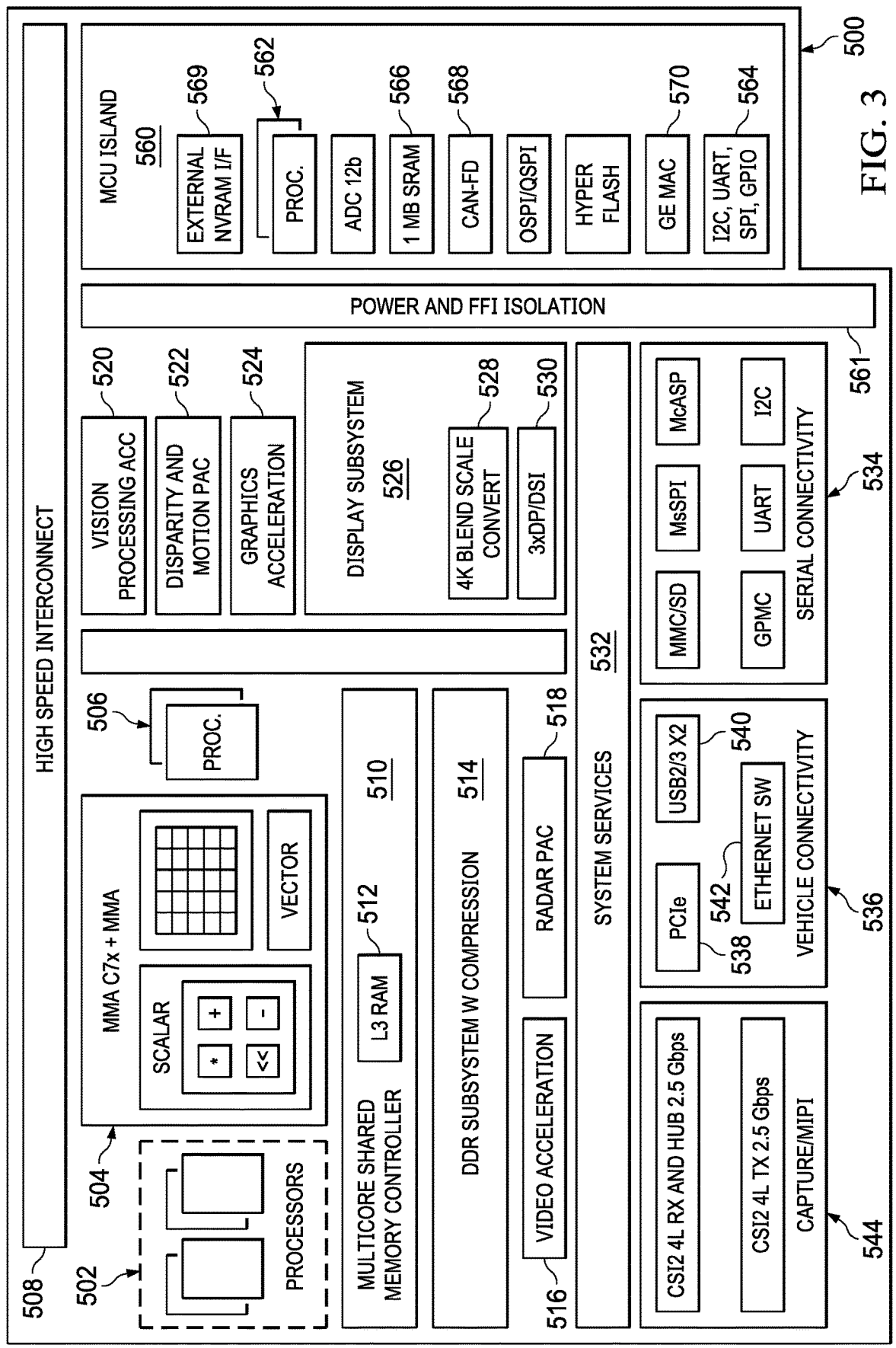
FIG. 3 is a block diagram of an SoC as used in the sensor modules of FIG. 2.

FIG. 3 is a block diagram of an exemplary system on a chip (SoC) 500 as can be used in the modules 202, 204, 210 or 212. A series of more powerful microprocessors 502, such as ARM® A72 or A53 cores, form the primary general-purpose processing block of the SoC 500, while a digital signal processor (DSP) 504 provides specialized computing capabilities. A simpler processor 506, such as ARM R5F cores, provides general control capability in the SoC 500. A high-speed interconnect 508 connects the microprocessors 502, DSP 504 and processor 506 to various other components in the SoC 500. For example, a shared memory controller 510, which includes onboard memory or SRAM 512, is connected to the high-speed interconnect 508 to act as the onboard SRAM for the SoC 500. A DDR (double data rate) memory controller system 514 is connected to the high-speed interconnect 508 and acts as an external interface to external DRAM memory. A video acceleration module 516 and a radar processing accelerator (PAC) module 518 are similarly connected to the high-speed interconnect 508. A vision processing accelerator (VPACC) module 520 is connected to the high-speed interconnect 508, as is a depth and motion PAC (DMPAC) module 522.

A graphics acceleration module 524 is connected to the high-speed interconnect 508. A display subsystem 526 is connected to the high-speed interconnect 508 and includes conversion logic 528 and output logic 530 to allow operation with and connection to various video monitors. A system services block 532, which includes items such as DMA controllers, memory management units, general-purpose I/O's, mailboxes and the like, is provided for normal SoC 500 operation. A serial connectivity module 534 is connected to the high-speed interconnect 508 and includes modules as normal in an SoC. A vehicle connectivity module 536 provides interconnects for external communication interfaces, such as PCIe block 538, USB block 540 and an Ethernet switch 542. A capture/MIPI module 544 includes a four-lane CSI-2 compliant transmit block 546 and a four-lane CSI-2 receive module and hub.

An MCU island 560 is provided as a secondary subsystem and handles operation of the integrated SoC 500 when the other components are powered down to save energy. An MCU ARM processor 562, such as one or more ARM R5F cores, operates as a master and is coupled to the high-speed interconnect 508 through an isolation interface 561. An MCU general purpose I/O (GPIO) block 564 operates as a slave. MCU RAM 566 is provided to act as local memory for the MCU ARM processor 562. A CAN bus block 568, an additional external communication interface, is connected to allow operation with a conventional CAN bus environment in the vehicle 100. An Ethernet MAC (media access control) block 570 is provided for further connectivity in the vehicle 100. External memory, generally non-volatile memory (NVM) is connected to the MCU ARM processor 562 via an external memory interface 569 to store instructions loaded into the various other memories for execution by the various appropriate processors. The MCU ARM processor 562 operates as a safety processor, monitoring operations of the SoC 500 to ensure proper operation of the SoC 500.

It is understood that this is one example of an SoC provided for explanation and many other SoC examples are possible, with varying numbers of processors, DSPs, accelerators and the like.

Figure 4:
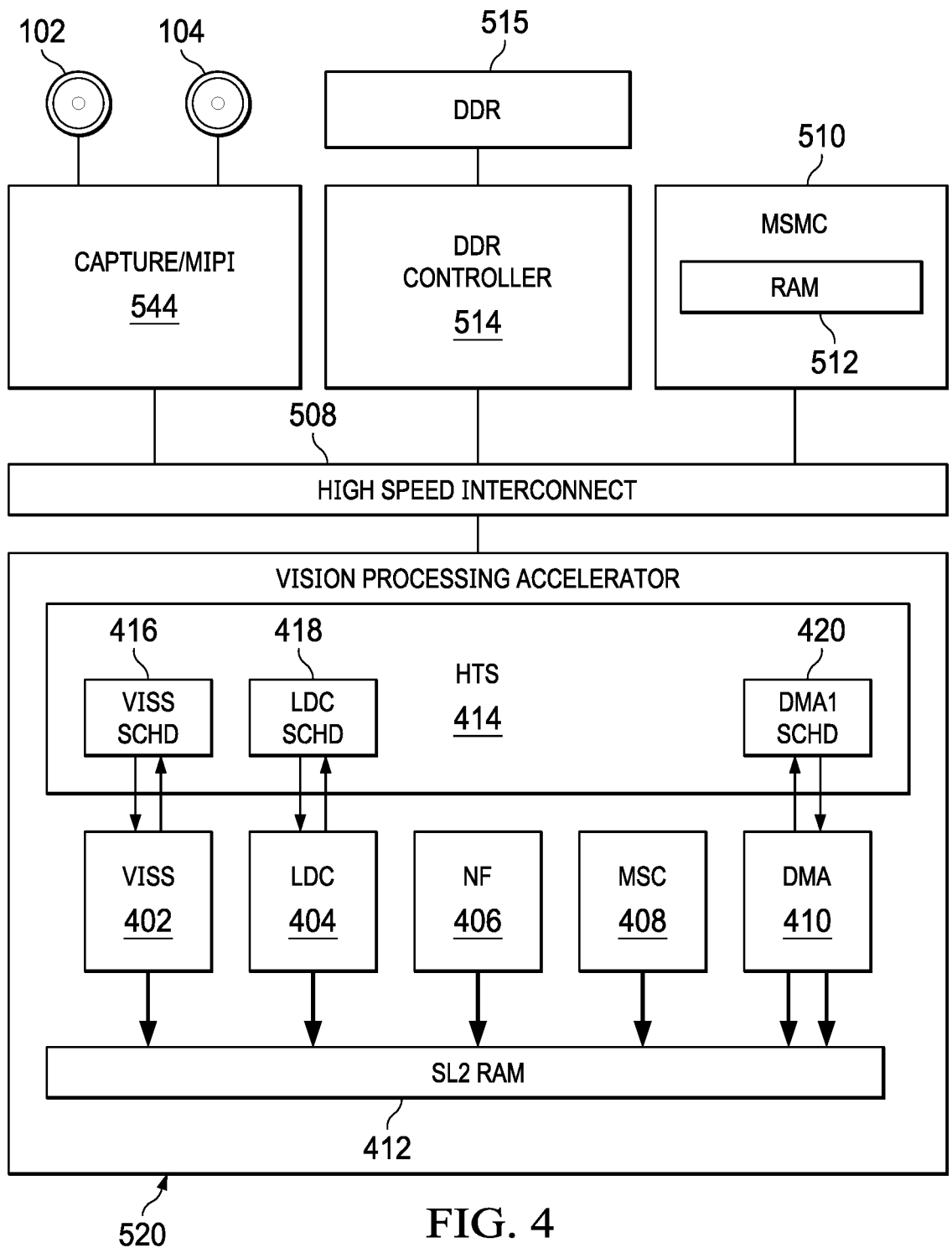
FIG. 4 is a block diagram of the vision processing accelerator and various memories of FIG. 3.

Referring now to FIG. 4, details of the vision processing accelerator 520 are provided. The vision processing accelerator 520 is connected to the high-speed interconnect 508 to allow the vision processing accelerator 520 access the DDR 515 via the DDR memory controller system 514 and the local SRAM 512 in the MSMC 510. The vision processing accelerator 520 includes four function modules, a vision imaging processor (VISS) 402, a lens distortion correction (LDC) function 404, a noise filtering (NF) function 406 and multi-scaling (MSC) function 408. The VISS 402 performs image processing on raw data which includes wide dynamic range merge, defect pixel correction (DPC), lens shading correction (LSC), contrast enhancement (GLBCE), demosiacing, color conversion and edge enhancement. The VISS 402 operates on sensor data either on-the-fly or from memory. The LDC function 404 performs and image data remapping function and applies perspective transform as well as correction of lens distortion. For more background on an LDC function, please refer to Mihir Mody, Rajshekar Allu, Niraj Nandan, Gang Hua, Hetul Sanghvi, Shashank Dabral, Brijesh Jadav, Sujith Shivalingappa and Jason Jones, "Flexible and efficient perspective transform engine," 2017 IEEE International Conference on Consumer Electronics-Asia (ICCE-Asia) (2017), p 111-114, which is hereby incorporated by reference. The NF function 406 does bilateral filtering to remove noise. The MSC function 408 generates scaled outputs from a given input with various scaling ratios.

A DMA controller 410 is provided to assist in data transfer as required. A shared level 2 (SL2) RAM 412, an SRAM, is connected to the VISS 402 and each of the functions 404-408 and the DMA controller 410 to operate as local memory for the functions. A hardware thread scheduler (HTS) 414 provides scheduling and coordination of pipeline operations between the various functions. For more details on the HTS, please refer to U.S. Patent Application Publication No. 2018/0189105, hereby incorporated by reference. A VISS scheduler 416 is illustrated as receiving an output or producer from the VISS 402 and providing an input or consumer to the VISS 402. The producer is provided when the VISS 402 completes a particular operation, while the consumer is provided when the VISS 402 is to begin processing, as at the start of a frame. An LDC scheduler 418 is connected to the LDC function 404. The LDC function 404 has a consumer and a producer to the LDC scheduler 418. This consumer allows the processing of the LDC function 404 to be started or proceed to the next operation, while the producer allows the LDC function 404 to indicate completion of a particular operation or of the entire frame to start the next function in the image processing pipeline. A DMA1 scheduler 420 is connected to the DMA controller 410 and includes both the producer and a consumer so that the DMA controller 410 operation is initiated by a related function in the image processing pipeline to transfer data between the SL2 RAM 412 and the DDR 515 or MSMC 510 and starts operations of a related function based on commencement or completion of the data transfers to or from the DDR 515 or MSMC 510. To aid in this description of the pipeline operations, cameras 102 and 104 to provide video image data are connected to the capture/MIPI module 544, which is connected to the high-speed interconnect 508.

Figure 5:
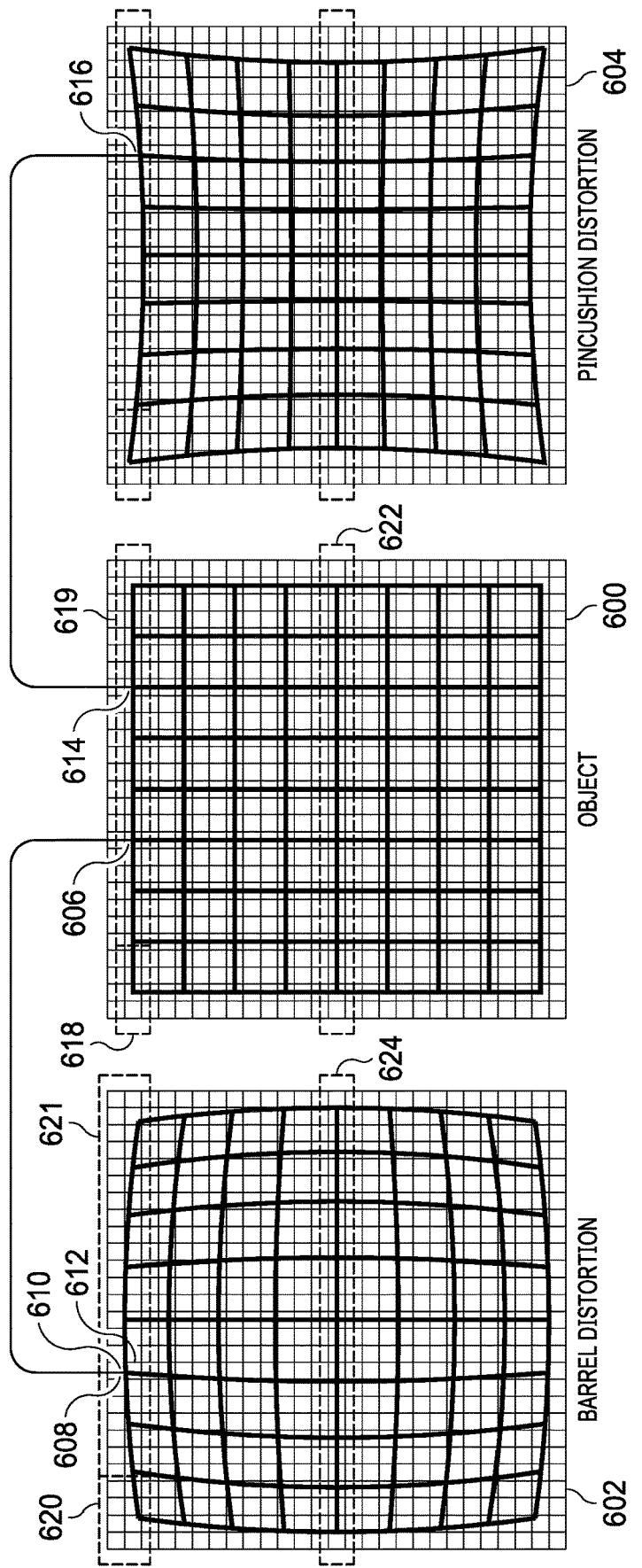
FIG. 5 is a diagram illustrating distortion remapping for wide angle lenses.

FIG. 5 provides three illustrations of an object grid, with two illustrated grids subject to distortion. An object grid 600 is a grid that represents the object that is being viewed by the particular lens that causes the distortion. As can be seen, this is a regular square grid. Barrel distortion is illustrated in a barrel distortion grid 602, while pincushion distortion is illustrated in a pincushion distortion grid 604. The barrel distortion grid 602 and the pincushion distortion grid 604 are the object image 600 as distorted by the particular lens that is doing either barrel or pincushion distortion. Referring to an underlying reference grid, illustrated by dashed lines behind the square pattern, it can be seen that the actual location of particular points has changed because of the distortion. For example, point 606 is the intersection of the top row of the object grid 600 and the third column from the left and is illustrated as centered in an underlying square in the second row and eleventh column from the left on the underlying reference grid. Point 606 translates to the barrel distortion grid 602 as point 608. Point 608 is on the line separating the top two rows and is in the eleventh column from the left on the underlying reference grid. Therefore, to properly develop the image data at point 606, two particular squares 610 and 612, the top two squares in the eleventh column of the underlying reference grid must be referenced in the barrel distortion grid 602 to allow the proper interpolation of the value needed to develop output image data for point 606. Similarly, point 614 on the object grid 600 maps to point 616 in the pincushion distortion grid 604. Again, it can be seen that the point has moved from the center of a square on the underlying reference grid to the edge of an adjacent square on the underlying reference grid, so that once again multiple squares are utilized to properly determine the value for the image data at point 614. From this it can be seen that for a particular point, multiple areas must be accessed in the distorted image to allow development of the original image or undistorted image as in the object grid 600.

The vision processing accelerator 520 operates on blocks, which are multiple lines and multiple columns of data, generally image pixel data. For example, block 618 represents the squares of the second line and left four columns in the object grid 600. Block 619 is formed by the remaining squares in the second line. Block 618 and block 619 form a row of blocks for the second line. Referring to the barrel distortion grid 602, the corresponding block to block 618 is block 620, which includes the squares of the top two lines and left four columns of the barrel distortion grid 602. Block 621 corresponds to block 619 and is formed by the remaining squares in the top two lines. Blocks 620 and 621 are the row of blocks for the top two lines.

In the center of the object grid 600, a single line of squares forms block 622, which maps to block 624, a single line of squares in the underlying reference grid in the barrel distortion grid 602. Thus, as can be seen, the number of reference grid squares or data blocks in the distorted image varies with the location of the desired blocks in the distortion free or output image.

In a specific example, the image being processed is an HD image, with 1920 columns and 1080 lines. The vision processing accelerator 520 has a block size of 64 columns and 54 lines, resulting in a grid of 30 blocks by 20 blocks. In the example, lines 94-253, a total of 166 lines, map to the first row of blocks. Then lines 108-277, a total of 170 lines, map to the second row of blocks. Lines 132-307, a total of 175 lines, map to the third row of blocks. Lines 542-617, a total of 75 lines, map to the eleventh row of blocks. Lines 838-992, a total of 153 lines, map to the twentieth row of blocks. As can be seen, the number of lines varies with the location of the row of blocks.

The examples of FIG. 5 show a mild barrel distortion or pincushion distortion and the remapping is more extreme in the case of a fisheye lens, where a large number of rows of blocks are be necessary in the barrel distortion grid 602 to map to a single row of blocks in the object grid 600.

Figure 6:
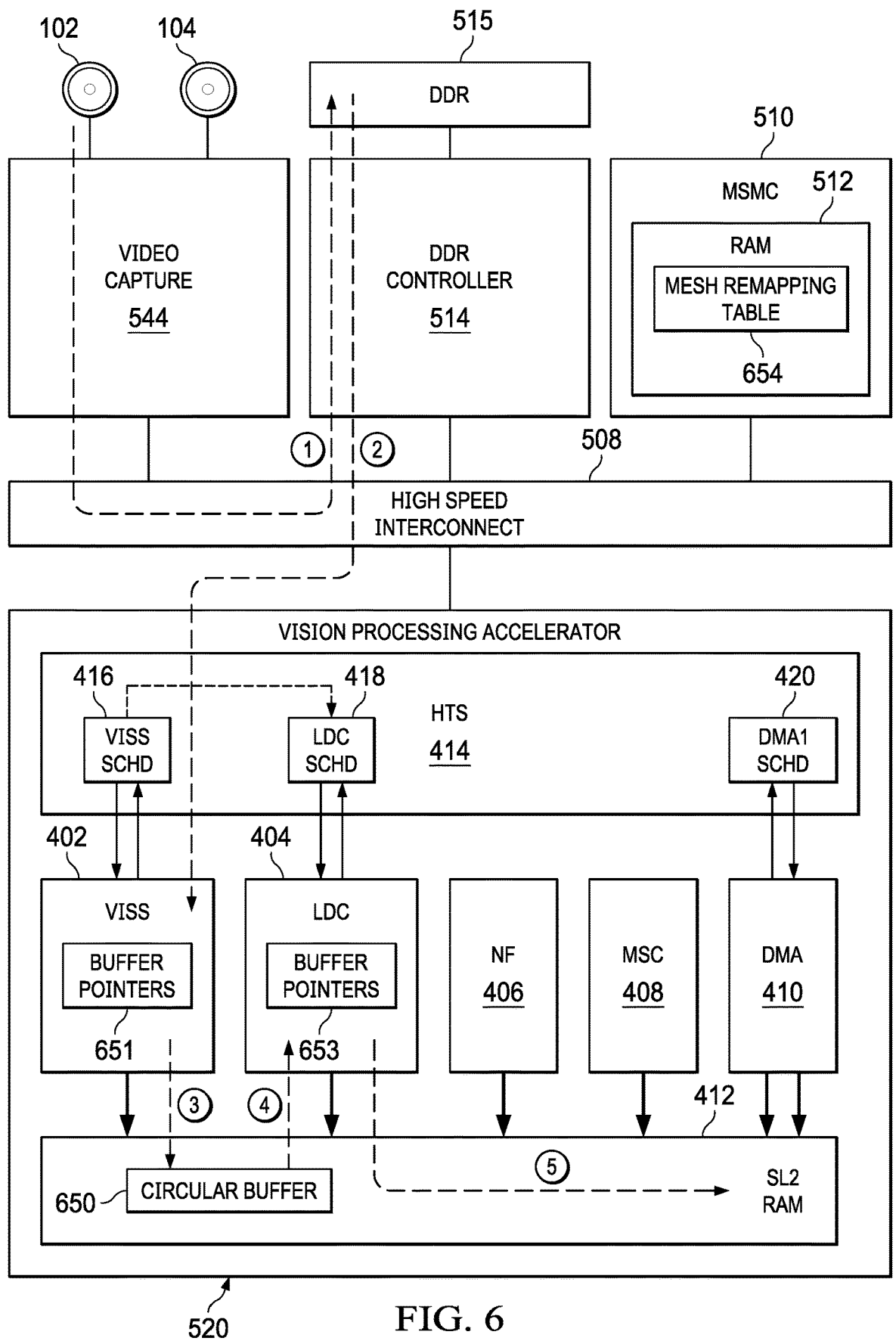
FIG. 6 is a first example of a vision processing accelerator with reduced delays and used DRAM bandwidth.

Referring to FIG. 6, operation of a first example is illustrated. Image data from the cameras 102 and 104 is received by the capture/MIPI module 544 and provided over the high-speed interconnect 508 to the DDR 515, as shown by path 1. The VISS 402 receives the image data from the DDR 515 using a DMA controller in the system services block 532, as shown by path 2. The VISS 402 performs the desired computations on the raw image data to process the input image data and after completion of the image data processing provides an output to a circular buffer 650 in the SL2 RAM 412, as shown by path 3. Buffer pointers 651 keep track of the beginning and end of the circular buffer 650 and the next write location. The VISS scheduler 416 has been programmed by the processor 506 with a table which indicates the input image lines that correspond to each output block of the LDC function 404.

The VISS 402 provides a producer or end of line processing signal as each line is completed. From these producers, the VISS scheduler 416 keeps track of the line number that the VISS 402 has just finished processing. When the appropriate number of lines have been processed by the VISS 402 and deposited in the circular buffer 650, the VISS scheduler 416 operates as an input image data block ready mapping element that determines that the lines needed for a block remapping operation are present in the SL2 RAM 412 and ready for operation by the LDC function 404. The VISS scheduler 416 provides an indication to the LDC scheduler 418, which also receives a signal indicating that there is available output buffer space in the SL2 RAM 412. The LDC scheduler 418 provides a notification to the LDC function 404 when both the chunk of data ready and output buffer availability signals are present, and thereafter for the rest of the row blocks when the output buffer availability signal is received and the LDC function 404 has completed the previous block.

A mesh remapping table 654 that contains values for remapping output image data locations in the output image data blocks to respective input image data locations in the input image data lines to properly obtain the needed image data has been placed in the SRAM 512 in the MSMC 510 by the processor 506. In another example the mesh remapping table 654 is located in the SL2 RAM 412. The LDC function 404 includes buffer pointers 653 to keep track of the beginning and end of the circular buffer 650 and the next read location. The LDC function 404 obtains or retrieves the appropriate image data for the desired output block, the multiple input lines needed for the particular output block being developed by the LDC function 404 based on the values in the mesh remapping table 654, as shown by path 4, and processes the retrieved input image data to provide the processed output image data. The completed undistorted image data is provided from the LDC function 404 to the SL2 RAM 412, as shown by path 5. The undistorted image data located in the SL2 RAM 412 can then be operated on by other functions in the image processing pipeline, such as the NF function 406 and the MSC function 408. The LDC function 404 provides a block completion signal to the LDC scheduler 418, which provides the notification to an appropriate scheduler for the NF function 406 or MSC function 408 at the end of each row of blocks or the end of the frame, as desired, as the LDC scheduler 418 is counting the completed blocks and then the rows of blocks to determine end of a row and end of the frame. The NF function 406 or the MSC function 408 then process the undistorted image data as defined by the image processing pipeline. These operations and later operations of the image processing pipeline are not shown for clarity.

The VISS 402 continues to process lines of the received image and provide the completed lines to the circular buffer 650. As the lines that are needed for the next block to be operated on by the LDC function 404 are deposited into the circular buffer 650, the VISS scheduler 416 provides a notification so that the LDC function 404 then operates on its next output block, as the necessary data is present in the circular buffer 650. The VISS 402 sequentially adds line image data to the circular buffer 650 while the LDC function 404 consumes it in blocks, with the LDC function 404 operating on a row of blocks as the needed lines are placed in the circular buffer 650 by the VISS 402. The circular buffer 650 is sized to hold at least the largest number of lines needed for an output row of buffers and the number of lines produced while the LDC function 404 processes a row of blocks.

Figure 7:
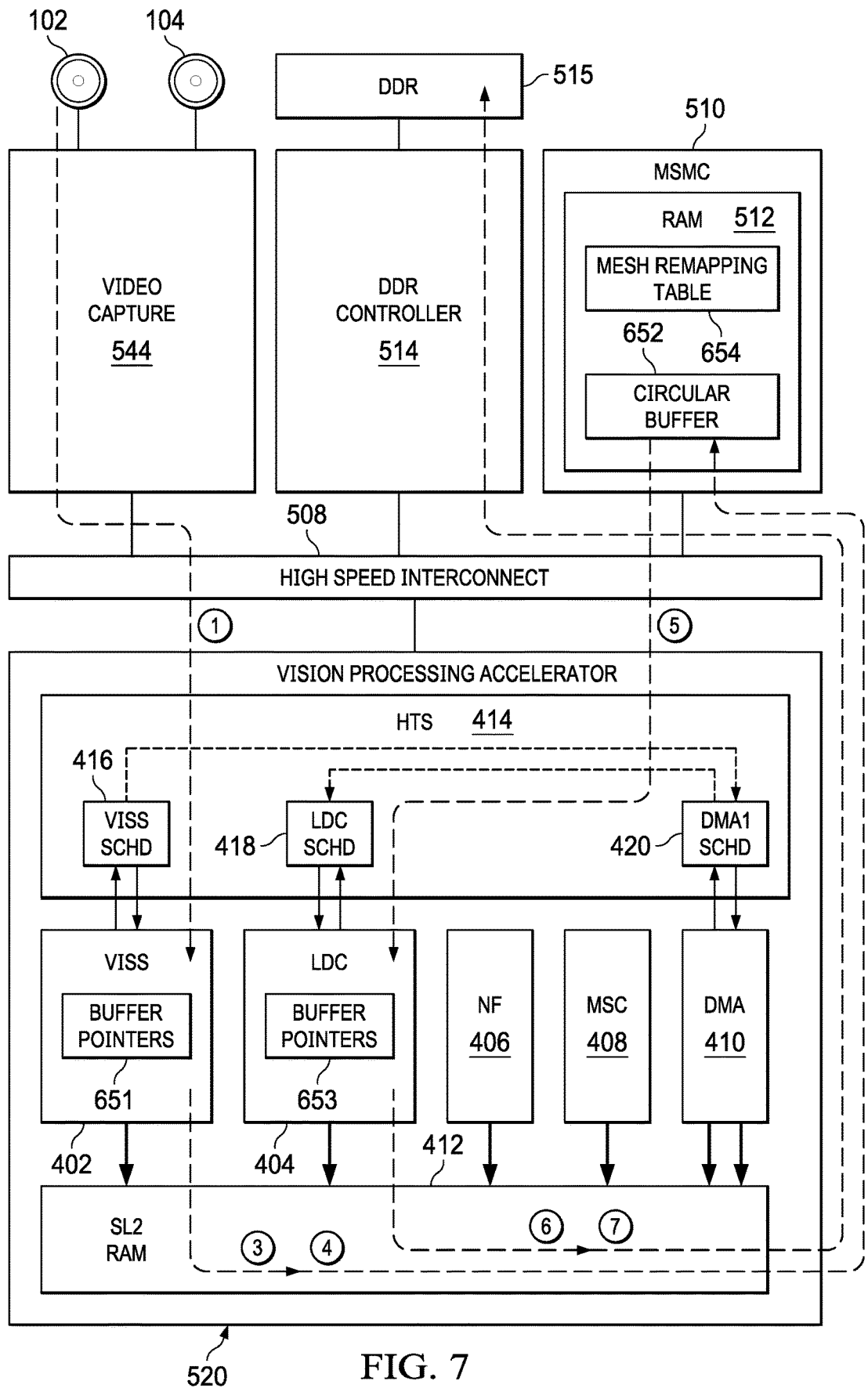
FIG. 7 is a second example of a vision processing accelerator with reduced delays and used DRAM bandwidth.

FIG. 7 is a second example. In this second example, the circular buffer 650 has been moved from the SL2 RAM 412 to be a circular buffer 652 in the SRAM 512 in the MSMC 510. Paths 1 and 2 are replaced by path 1 going directly from the capture/MIPI module 544 to the VISS 402. When the VISS 402 completes processing a line, the VISS 402 outputs the image data to the SL2 RAM 412 using path 3 as before. The VISS 402 provides notification to the VISS scheduler 416, which in turn notifies the DMA1 scheduler 420 that the line is available. The VISS scheduler 416 also increments the line number value to use in informing the LDC function 404 that a row of blocks can be processed. The DMA1 scheduler 420 provides notification to the DMA controller 410 so that the line is moved from the SL2 RAM 412 to the circular buffer 652, as shown by path 4. When the line is moved to the circular buffer 652, the DMA1 scheduler 420 provides an indication to the LDC scheduler 418 that the image data is available in the circular buffer 652. The LDC scheduler 418 combines this with a signal from the VISS scheduler 416 that indicates that the VISS 402 has completed processing the line need for the next row of blocks. The combined signal, when combined with another signal that indicates the previous block of image data has been moved to the DDR 515 and working buffer space in the SL2 RAM 412 is available, then triggers operation of the LDC function 404. If the working buffer space is sufficient to hold the data for the entire row of blocks, the working buffer space signal is always true. If the working buffer space only holds data for two blocks, the working buffer space signal is provided after the data of each block has been moved. The LDC function 404 retrieves the necessary lines from the circular buffer 652 as shown by path 5 and develops the desired row of output image data blocks. The output blocks are provided to the SL2 RAM 412 as shown in path 6. The LDC function 404 provides a notification to the LDC scheduler 418 with the completion of each block. The LDC scheduler 418 provides a notification to the DMA1 scheduler 420 at the completion of each block or at the end of the row of blocks, based on the size of the working buffer. The DMA1 scheduler 420 provides the notification to the DMA controller 410 and the output image data is transferred to the DDR 515, as shown by path 7. The completion of this move is effectively the signal to indicate the working buffer space is available, either block by block or for the row of blocks.

By having the LDC function 404 operate out of the circular buffer 650 or 652, the LDC function 404 does not have to access the DDR 515 to obtain the necessary back remapping information. This reduces the bandwidth demand on the DDR 515, allowing additional functions to utilize the DDR 515. Because the VISS scheduler 416 keeps track of the lines in the circular buffer 650 to use in the block operations, so that the LDC function 404 operates on the image data as soon as the necessary data has been developed by the VISS 402, the image processing pipeline delays are reduced as the LDC function 404 is no longer waiting for an entire frame to be completed but is overlapping operations with the VISS 402.

From this description it can be seen that the SL2 RAM 412, the SRAM 512 holding the mesh remapping table 654, the LDC function 404 and the VISS scheduler 416 operate as an image data remapping engine.

FIGS. 8, 9, 10 and 11 provide timing diagrams to illustrate the operation and interaction of the VISS 402 and the LDC function 404. At time 802, the HTS 414, VISS 402, LDC function 404, NF function 406, MSC function 408 and DMA controller 410 are programmed by the processor 506 for the image processing function relevant for the frame to be processed, which includes a lens distortion operation in the example. At time 804, the initialization of the HTS 414, VISS 402, LDC function 404, NF function 406, MSC function 408 and DMA controller 410 are complete and the mesh remapping table 654 has been programmed and processing can begin. At time 804, the LDC function 404 begins operation, the first operation being affine calculations on the corner coordinates for the first output block to be operated on, block (0,0), where the first digit is the row number and the second digit is the block number in the row. The LDC function 404 operates on blocks, which are a series of lines and columns of pixels. A row of blocks forms the complete lines for number of lines in a block, such as blocks 618 and 619 forming all of the second line of grid 600 or blocks 620 and 621 forming all of the top two lines of grid 602. The full set of rows of blocks forms the output image frame. Shortly after time 804, the LDC function 404 determines the mesh bounding box, the limits in the remapping mesh or lookup table used to perform the lens distortion correction for the first output block.

Sometime later, when the VISS 402 finishes operations on the lines referenced by the first row of output blocks being developed by the LDC function 404 as determined by the VISS scheduler 416 and signaled to the LDC scheduler 418, the image data that has been processed by the VISS 402 has been moved to the circular buffer 650, 652 and a working buffer in the SL2 RAM 412 is available to receive the output of the LDC function 404, the LDC scheduler 418 provides, at time 806, an hts_tstart signal for block (0,0) to the LDC function 404. The LDC function 404 obtains the lookup table or mesh data values for the output block being developed from the mesh remapping table 654. When the mesh data is retrieved at time 808, the obtained mesh data values are utilized to develop the coordinates of the corner of the block to be developed and shortly thereafter the bounding box is developed for the input image data from the VISS 402. At time 810, the image data inside the image bounding box, the portions of the desired lines as output by the VISS 402 that map to the output block (0,0) of the LDC function 404 being developed, are retrieved. The image data retrieval is completed at time 812.

After the image data retrieval completes at time 812, the cycle repeats and the affine calculations for the corners of the next output block, block (0,1), are developed by the LDC function 404, followed by the bounding box computations for the mesh. At time 814, a block (0,1) hts_tstart signal is received by the LDC function 404, indicating that the working buffer is ready to receive the output of the LDC function 404 for the next block. Upon receiving the hts_tstart signal, the LDC function 404 retrieves the necessary mesh data for block (0,1). At this time, the main block processing, the primary image distortion operations, is commenced by the LDC function 404 for block (0,0), and undistorted image data is written to the working buffer in the SL2 RAM 412.

After the mesh data for the next block (0,1) is retrieved, the mesh corner coordinates are developed and the image bounding box is computed. Then at time 816 the necessary image data for the next block (0,1) is retrieved from the circular buffer 650 or 652. At time 818, the processing of the image data of block (0,0) is completed by the LDC function

404. The LDC function 404 completes writing the image output data to the SL2 RAM 412 at time 820. The output write operation starts at time 815 and ends at time 820. At time 820, a block (0,0) hts_tdone signal is provided by the LDC function 404 to the LDC scheduler 418, to allow the image data to be transferred to the DDR 515 if desired as described above.

Figure 9:
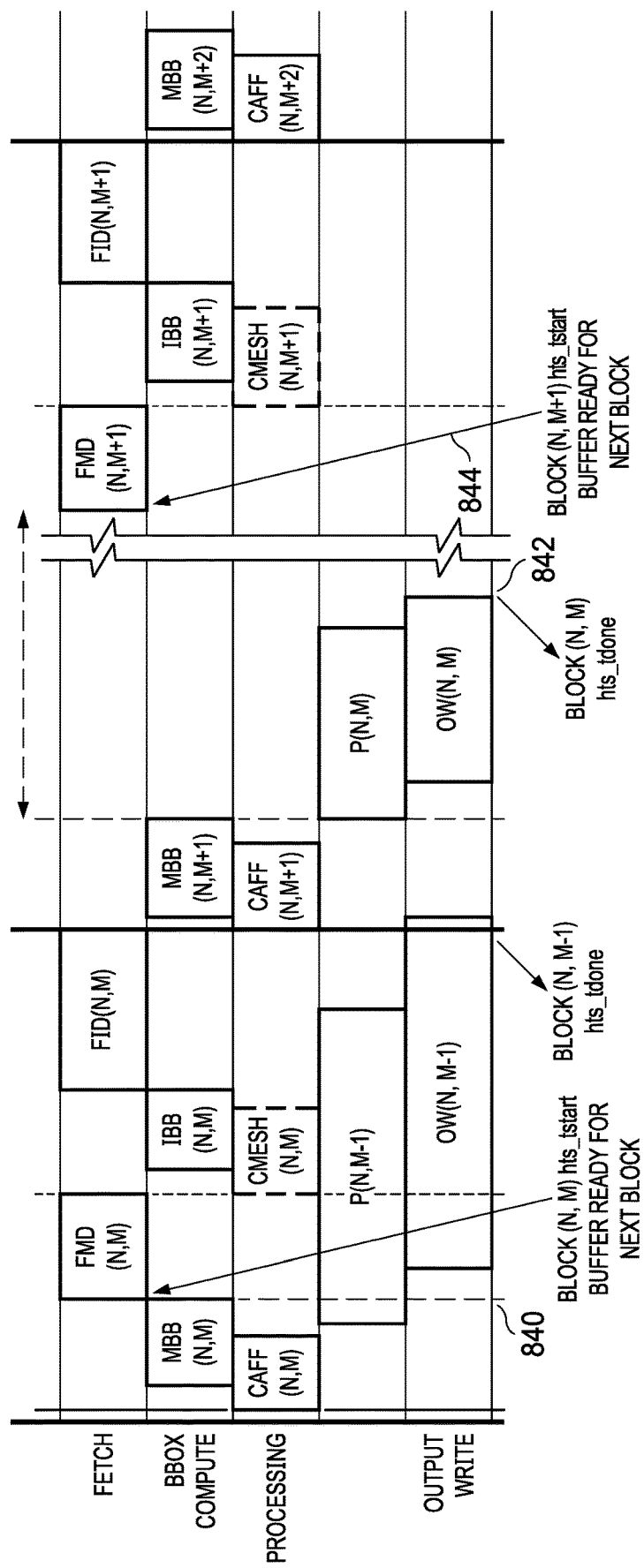
FIG. 9 is a timing diagram of distortion processing for intermediate portions of a row of blocks.

FIG. 9 shows processing of intermediate blocks of a row of blocks by the LDC function 404. As can be seen, data operations for a block (N,M) commence when a block (N,M) hts_start signal is received at time 840 to indicate that the working buffer in the SL2 RAM 412 is available, the affine calculation and mesh bounding box being previously completed based on the completion of the input image data retrieval of the previous block. The input image data, provided by VISS 402, was indicated available to start the first block of the row, so the input image data is known to be available. As above, the mesh data is retrieved, the mesh corners are determined, the image bounding box is determined, the image data is retrieved, the affine calculations and mesh bounding box are completed for the next block, the image data processed and then output. At time 842, an hts_tdone signal for block (N,M) is provided. The LDC scheduler 418 monitors the hts_tdone signals and in this case increments a block counter to keep track of the blocks computed in the row. The LDC scheduler 418 also provides a signal to the DMA1 scheduler 420 to have the DMA controller 410 move the output undistorted image data from the working buffer to the DDR 515, as in the example the working buffer only holds output image data for two blocks. When the DMA controller 410 finishes that operation, a signal is provided back to the LDC scheduler 418 to form the hts_tstart signal for the next block in the row. That hts_tstart signal is provided at time 844. Because the DMA controller 410 may take a relatively long time to move the image data, the period between time 842 and time 844 is shown as being variable.

Figure 8:
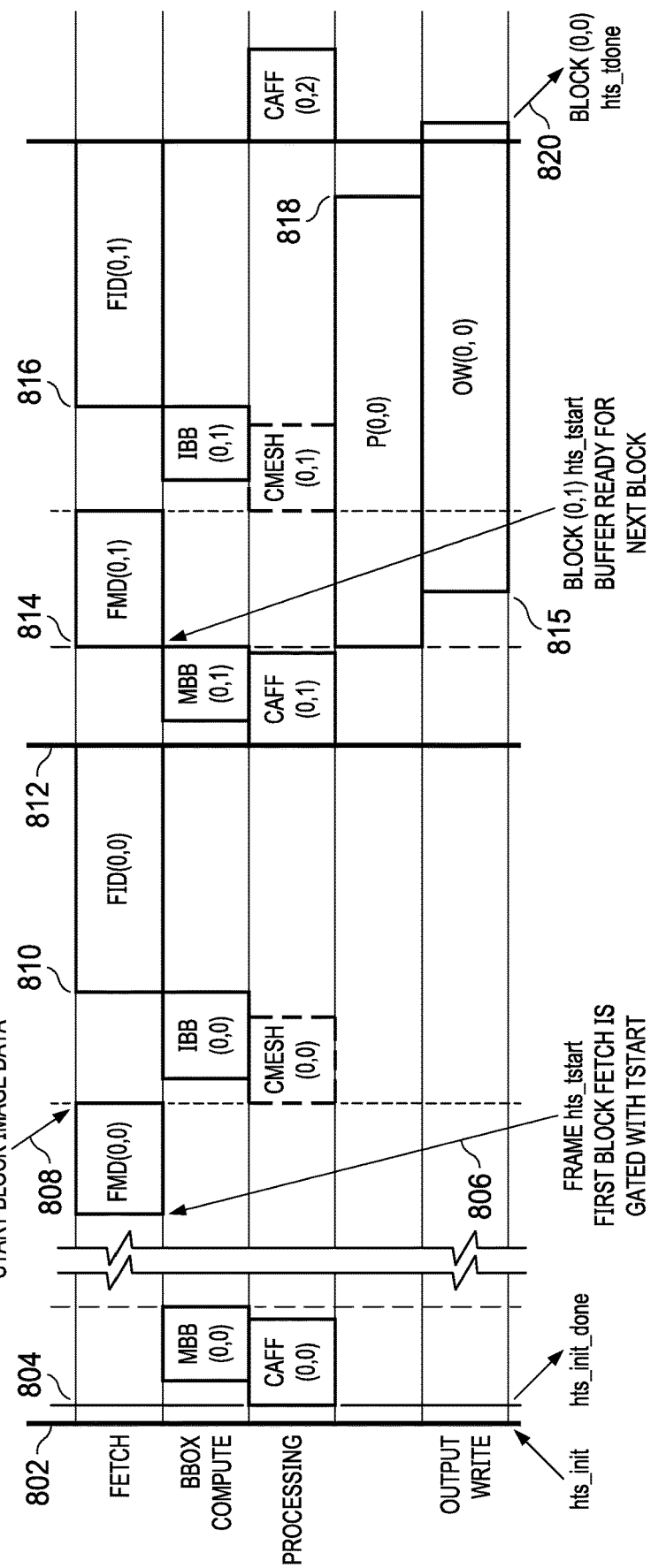
FIG. 8 is a timing diagram of the start of distortion processing for a frame.
Figure 10:
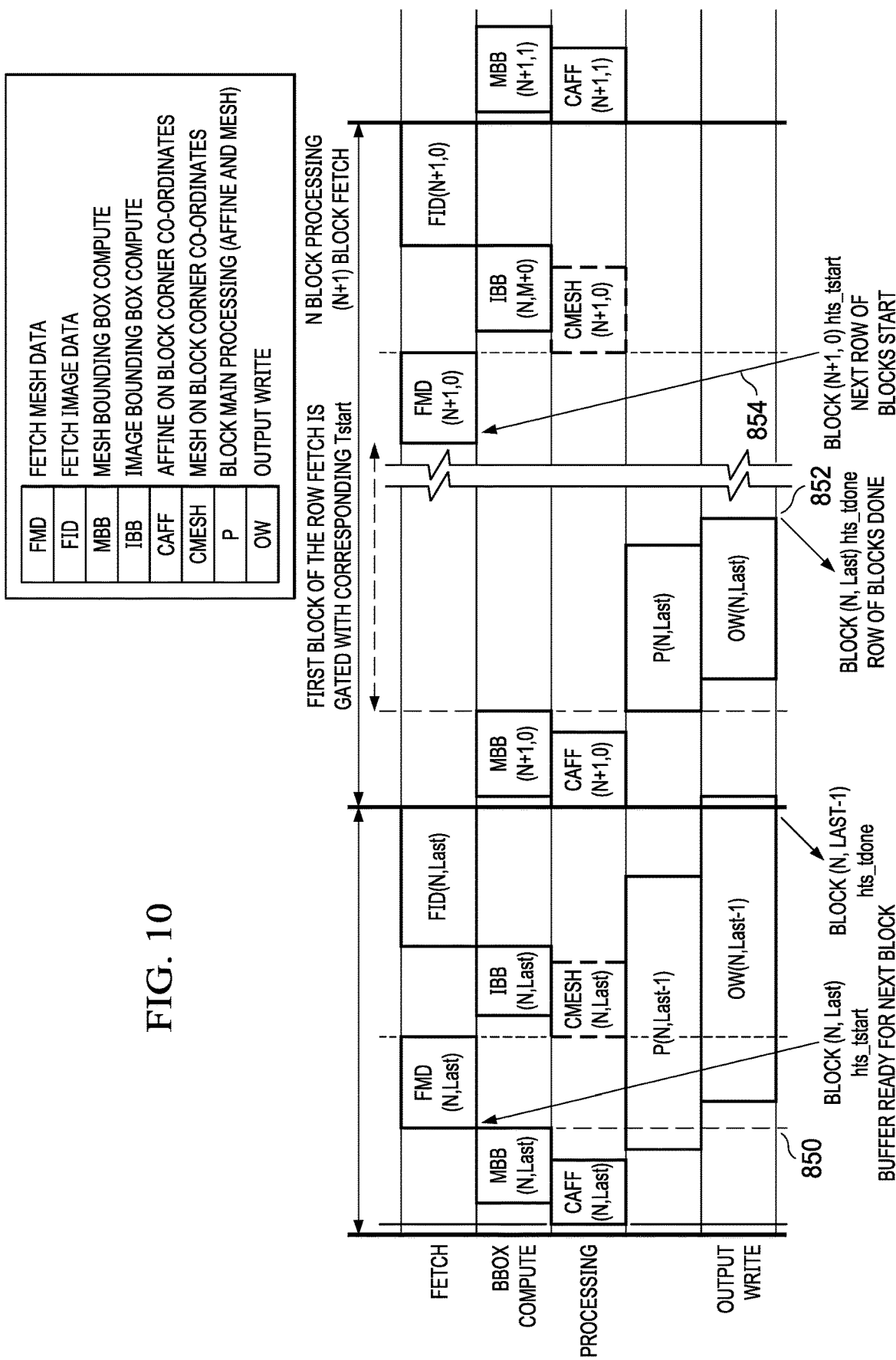
FIG. 10 is a timing diagram of distortion processing for the end of a row of blocks.

FIG. 10 illustrates the processing of the last block in a row and then the first block in the next row. At time 850, the LDC function 404 receives an hts_start signal for the last block, block (N, Last). The LDC function 404 operates as described above. After retrieving the image data for the last block, the LDC function 404 computes the affine calculations for the corners of the first block of the next row, block (N+1,0) and the bounding box computations for the mesh of block (N+1,0). The LDC function 404 completes writing the image data to the working buffer and provides an hts_tdone signal at time 852 to the LDC scheduler 418. The LDC scheduler 418 recognizes this hts_tdone signal as the one for the last block in the row and provides an indication to the DMA1 scheduler 420 as normal but also sets an internal flag that blocks the delivery of an hts_tstart signal until a signal is received from the VISS scheduler 416 that the VISS 402 has finished the last line needed for the upcoming row of blocks. In some examples, the LDC scheduler 418 also provides a signal to the next scheduler in the image processing pipeline, so that the next function can proceed on performing operations on the lines of the row of blocks that has just been completed by the LDC function 404, providing overlap between the LDC function 404 and the next operation in the image processing pipeline. The LDC scheduler 418 receives the last line finished signal from the VISS scheduler 416 and the working buffer ready signal and then provides the hts_start signal for block (N+1,0) to the LDC function 404 at time 854. Operation proceeds as described for the first block of the frame, as shown in FIG. 8.

Figure 11:
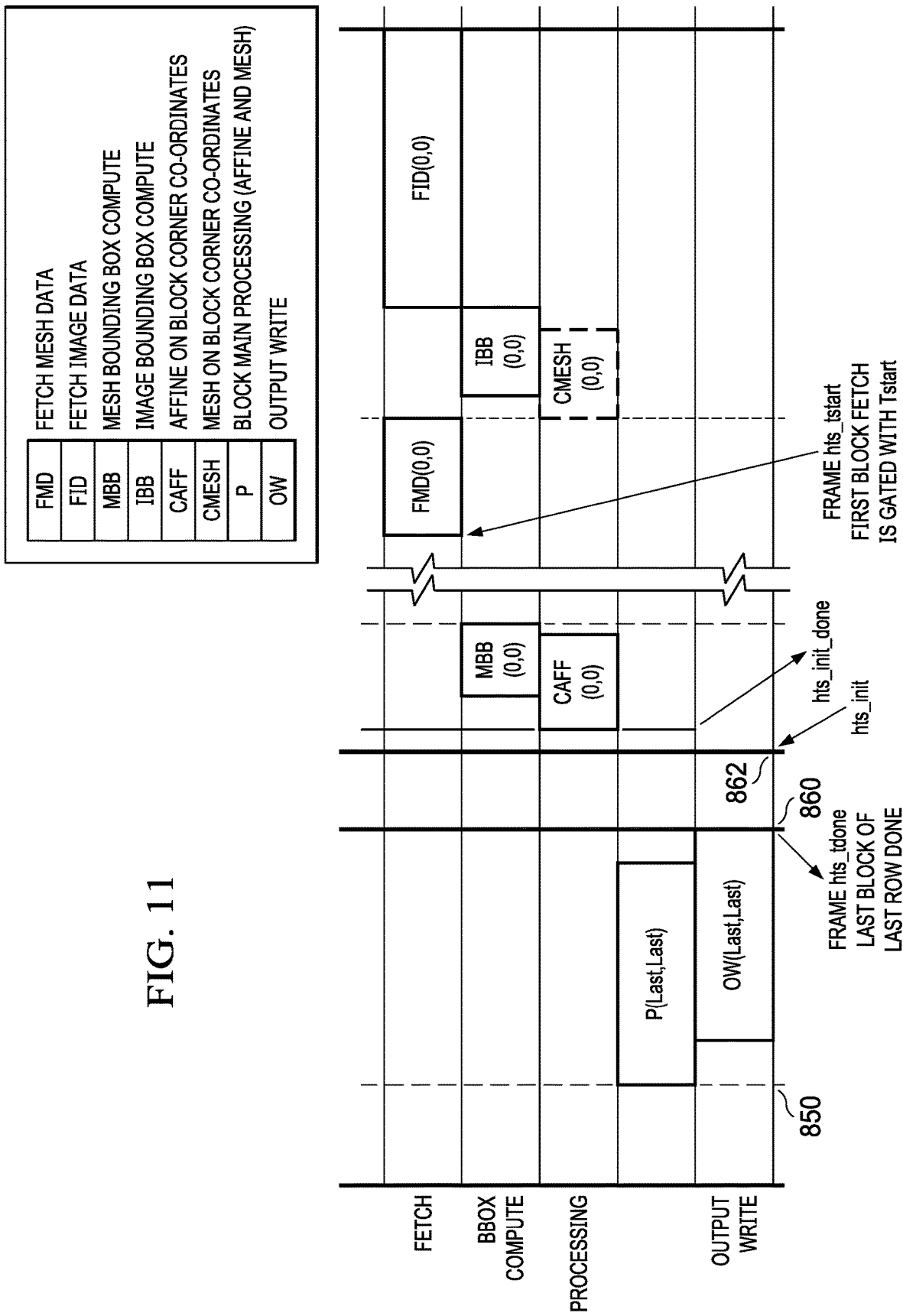
FIG. 11 is a timing diagram of the end of distortion processing of a frame.

FIG. 11 illustrates the processing of the last block of a frame and the first block of the next frame. Unlike the processing of the previously described blocks, for the last block of the frame, the LDC function 404 does not compute the affine calculations for the corners of the first block of the next frame, block (0,0), and the bounding box computations for the mesh of block (0,0) as the LDC function 404 and the various HTS schedulers such as the VISS scheduler 416 and LDC scheduler 418 will be reconfigured for the next frame.

When the image data of the last block, block (Last,Last), is finished being written to the working buffer, at time 860, an hts_tdone signal is provided. As the LDC scheduler 418 has been keeping track of rows and blocks, the LDC scheduler 418 knows that this is the hts_tdone signal for the last block of the frame. The LDC scheduler 418 provides a signal to the DMA1 scheduler 420 as normal to have the last block of image data transferred to the DDR 515. The LDC scheduler 418 provides a signal to the next scheduler in the image processing pipeline, so that the next function can proceed on performing operations on the lines of the row of blocks that has just been completed by the LDC function 404. If the next function is operating on a full frame of data and not on lines as provided incrementally by the LDC function 404, this signal is then the start signal for that function. The LDC scheduler 418 further provides an interrupt to the processor 506 to inform the processor 506 that the frame has been completed by the LDC function 404 and the vision processing accelerator 520 needs to be reprogrammed for the next frame to be processed. This interrupt is illustrated as the hts_init signal at time 862. Operations then proceed as described for FIG. 8.

The reprogramming of the hardware thread scheduler 414 and the various functions, such as the LDC function 404, is done in this example because the vision processing accelerator 520 only operates on a single thread so that when a particular thread, a single frame from a given camera for example, has been completed, the vision processing accelerator 520 must be reprogrammed for the next frame for the next camera. It is understood that the reprogramming of the hardware thread scheduler 414 and other blocks could be omitted between frames if the vision processing accelerator 520 and its particular functions is capable of multithreaded operation by containing the appropriate contexts for the particular threads to be operated. Then the transition from one frame of one camera to a frame of another camera is done by indicating a context switch rather than reprogramming the hardware thread scheduler 414 and LDC function 404 and so on.

By beginning LDC function 404 operation as soon as the needed lines are available, VISS 402 and LDC function 404 operations can be overlapped, reduced overall image processing pipeline delay. By using a circular buffer to hold data from the VISS 402 to be processed by the LDC function 404, rather than sending the data to DDR 515, DDR 515 bandwidth use is decreased, as the scattered read operations needed for the back remapping distortion correction operation need not be handled by the DDR 515. This both decreases the delay in the image processing pipeline and increases the available bandwidth of the DDR 515.

While the VISS scheduler 416 has been described as including the mapping of lines to LDC function 404 blocks, in one example this mapping can be done in a spare scheduler. In this example, the VISS scheduler 416 provides an indication to the spare scheduler upon the completion of each line by the VISS 402. The spare scheduler then provides the block ready signal to the LDC scheduler 418.

While the above description has utilized correction of barrel or pincushion geometric distortion as examples, the back remapping and described operations are also suitable for chromatic aberration correction, changing the virtual camera viewpoint, constructing any desirable panorama output view, or any combinations of the above.

The above description is intended to be illustrative, and not restrictive. For example, the above-described examples may be used in combination with each other. Many other examples will be apparent upon reviewing the above description. The scope should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A device comprising:
    a first memory configured to store a frame of input image data that includes a first subset of the frame;
    a second memory configured to store output image data that includes a first block associated with the first subset of the frame;
    first and second schedulers coupled to the first memory, wherein the first scheduler is configured to provide to the second scheduler a notification associated indicating that the first block is ready for processing the second scheduler receiving an indication that space for at least the first block is available in the second memory;
    an image processing circuit coupled to the first memory, the second memory, and the second scheduler, wherein the image processing circuit is configured to, based on the notification:
        prior to the first memory completely storing the frame of input image data, read the first subset of the frame from the first memory;
        process the first subset of the frame to produce the first block; and
        provide the first block for storing by the second memory.

2. The device of claim 1, wherein the image processing circuit is further configured to process the first subset of the frame by applying a lens distortion correction to the first subset of the frame to produce the first block.

3. The device of claim 2 further comprising a third memory configured to store a mesh remapping table associated with lens distortion correction of the first subset of the frame, wherein the image processing circuit is further configured to:
    read the mesh remapping table from the third memory; and
    apply the lens distortion correction to the first subset of the frame based on the mesh remapping table.

4. The device of claim 1, wherein:
    the input image data is arranged in lines;
    the lines include a first line that includes the first subset of the frame; and
    the first scheduler is configured to keeps track of each line that is processed by a different image processing circuit.

5. The device of claim 1, wherein:
    the image processing circuit is a first image processing circuit;
    the input image data is a first set of input image data;
    the device further comprises a second image processing circuit coupled to the first memory and configured to couple to an image capture device; and
    the second image processing circuit is configured to:
        receive a second set of input image data from the image capture device;
        perform at least one of: wide dynamic range merging, defect pixel correction, lens shading correction, contrast enhancement, demosiacing, color conversion, or edge enhancement on the second set of input image data to produce the first set of input image data; and
        provide the first set of input image data for storing by the first memory.

6. The device of claim 1, wherein:
    the notification is a first notification; and
    the second scheduler is coupled to the second memory and configured to provide a second notification to the image processing circuit that the first block is ready for processing response to receiving the first notification and the indication that space is available in the second memory to store the first block; and
    the image processing circuit is configured to read the first subset of the frame from the first memory further based on the second notification.

7. The device of claim 6, wherein:
    the second scheduler is coupled between the first scheduler and the image processing circuit.

8. The device of claim 1, wherein the first memory is a buffer.

9. The device of claim 1, wherein a size of the first memory is less than a size of the frame.

10. The device of claim 1, wherein:
    the frame includes a second subset;
    the output image data includes a second block associated with the second subset of the frame;
    the notification is a first notification;
    the first scheduler is configured to provide a second notification associated with the second block based on the second subset of the frame being available in the first memory.

11. The device of claim 10, wherein the image processing circuit is further configured to read the second subset of the frame from the first memory based on the second notification during a time period that at least partially overlaps with the processing of the first subset of the frame to produce the first block.

12. A method comprising:
    monitoring a memory to determine when a subset of a frame for a processing operation has been stored in the memory, wherein the subset is associated with a block of output image data;
    based on the subset of the frame being stored in the memory, providing a notification by a scheduler to an image processor;
    based on the notification, reading, by the image processor, the subset of the frame from the memory prior to completely storing the frame in the memory;
    performing, by the image processor. the processing operation on the subset of the frame to produce the block; and
    providing the block.

13. The method of claim 12, wherein the processing operation includes a lens distortion correction operation.

14. The method of claim 13 further comprising based on the notification, reading a mesh remapping table associated with the lens distortion correction, wherein the performing of the lens distortion correction is performed according to the mesh remapping table.

15. The method of claim 14, wherein the reading of the subset of the frame includes determining a boundary of the subset of the frame based on the mesh remapping table.

16. The method of claim 12, wherein:
the frame includes a set of lines that includes a first line that includes the subset; and
the monitoring of the memory to determine when the subset of the frame has been stored in the memory includes monitoring the memory to determine when the first line has been stored in the memory.

17. The method of claim 12 further comprising:
receiving a set of image sensor data;
performing at least one of: wide dynamic range merging, defect pixel correction, lens shading correction, contrast enhancement, demosiacing, color conversion, or edge enhancement on image sensor data to produce the frame; and
storing the frame in the memory.

18. The method of claim 12, wherein:
the memory is a first memory;
the method further comprises:
monitoring a second memory to determine when a region of the second memory is available to store the block; and
providing a signal based on the region of the second memory being available to store the block.

19. The method of claim 12, wherein:
the subset is a first subset;
the frame includes a second subset;
the block is a first block;
the output image data includes a second block associated with the second subset of the frame;
the notification is a first notification;
the method further comprises:
monitoring the memory to determine when the second subset of the frame for the processing operation has been stored in the memory; and
based on the second subset of the frame being stored in the memory, providing a second notification by the scheduler to the image processor to perform the processing operation on the second subset of the frame to produce a second block.

* * * * *